(12) United States Patent
Sumners et al.

(10) Patent No.: US 12,532,862 B2
(45) Date of Patent: Jan. 27, 2026

(54) COMBINATION PET GROOMING TOOL AND METHODS

(71) Applicant: Spectrum Brands, Inc., Middleton, WI (US)

(72) Inventors: Lindsay Sumners, Middleton, WI (US); Christopher Robert Stoll, Middleton, WI (US); Gregory van Eyk, Middleton, WI (US)

(73) Assignee: Spectrum Brands, Inc., Middleton, WI (US)

( * ) Notice: Subject to any disclaimer, the term of this patent is extended or adjusted under 35 U.S.C. 154(b) by 0 days.

(21) Appl. No.: 18/684,467

(22) PCT Filed: Aug. 16, 2022

(86) PCT No.: PCT/US2022/040483
§ 371 (c)(1),
(2) Date: Feb. 16, 2024

(87) PCT Pub. No.: WO2023/023068
PCT Pub. Date: Feb. 23, 2023

(65) Prior Publication Data
US 2024/0349697 A1   Oct. 24, 2024

Related U.S. Application Data

(60) Provisional application No. 63/234,427, filed on Aug. 18, 2021.

(51) Int. Cl.
*A01K 13/00* (2006.01)
(52) U.S. Cl.
CPC ................... *A01K 13/002* (2013.01)

(58) Field of Classification Search
CPC ........ A01K 13/002; A46B 9/02; A46B 9/023; A46B 9/025; A46B 17/06; B25G 1/102
USPC .................................................. 119/628, 625
See application file for complete search history.

(56) References Cited

U.S. PATENT DOCUMENTS

| | | | | |
|---|---|---|---|---|
| 180,749 | A | * | 8/1876 | Bristol ................. A01K 13/002 119/632 |
| 218,812 | A | * | 8/1879 | Gawthorpe .......... A01K 13/002 119/612 |
| 250,685 | A | * | 12/1881 | Smith .................. A01K 13/002 119/611 |
| 307,574 | A | * | 11/1884 | Newell et al. ....... A01K 13/002 119/628 |

(Continued)

FOREIGN PATENT DOCUMENTS

| | | |
|---|---|---|
| CN | 10741007 A | 12/2017 |
| WO | 2020105783 A1 | 5/2020 |

OTHER PUBLICATIONS

International Search Report and Written Opinion for PCT/US2022/040483 (Dec. 1, 2022).

*Primary Examiner* — Timothy D Collins
*Assistant Examiner* — Maria E Graber
(74) *Attorney, Agent, or Firm* — Merchant & Gould P.C.

(57) ABSTRACT

A pet grooming tool has a pet engageable portion and a handle portion. The pet engageable portion has a first section of a first brush characteristic sandwiched between a second section and third section of brush characteristics different from the first brush characteristic. The handle portion is secured to the pet engageable portion and is sized for grasping by a human hand.

14 Claims, 5 Drawing Sheets

(56) References Cited

U.S. PATENT DOCUMENTS

| | | | | |
|---|---|---|---|---|
| 429,010 | A * | 5/1890 | Burke | A01K 13/002 132/120 |
| 649,894 | A * | 5/1900 | Allen | A01K 13/002 119/612 |
| 1,164,204 | A * | 12/1915 | Mullett | A01K 13/002 119/628 |
| 1,770,749 | A * | 7/1930 | Axel | A01K 13/002 604/315 |
| 3,368,554 | A * | 2/1968 | Hwa | A45D 24/42 15/184 |
| 5,267,528 | A * | 12/1993 | Murieen, Sr. | A01K 13/002 119/628 |
| 5,862,563 | A * | 1/1999 | Hartmann | A46B 17/06 15/246 |
| 6,279,582 | B1 * | 8/2001 | Wang | A46B 7/06 119/632 |
| 6,427,633 | B1 * | 8/2002 | Ogden | A01K 13/002 119/600 |
| 6,681,775 | B2 * | 1/2004 | Wang | A46B 7/023 15/186 |
| 7,124,712 | B2 * | 10/2006 | Berman | A01K 13/002 119/633 |
| 7,225,815 | B2 * | 6/2007 | Kung | A46B 17/06 132/119 |
| 7,650,857 | B2 | 1/2010 | Porter et al. | |
| 8,082,887 | B2 * | 12/2011 | Fernandez | A01K 13/002 119/664 |
| 8,656,933 | B2 * | 2/2014 | Boyd | A46B 15/0002 132/120 |
| 8,960,129 | B2 * | 2/2015 | Porter | A01K 13/002 119/632 |
| 9,795,116 | B1 * | 10/2017 | Czajkowski | A01K 13/002 |
| 10,004,322 | B2 * | 6/2018 | Jungnickel | A46B 9/06 |
| 10,589,415 | B2 * | 3/2020 | Cafasso | A47L 25/005 |
| 12,284,984 | B2 * | 4/2025 | Himes | A01K 13/002 |
| 2002/0029749 | A1 * | 3/2002 | Berman | A01K 13/002 119/628 |
| 2007/0033758 | A1 * | 2/2007 | Wang | A46B 17/06 15/169 |
| 2008/0017217 | A1 * | 1/2008 | Leung | A46B 9/10 132/313 |
| 2010/0122663 | A1 * | 5/2010 | Fernandez | A01K 13/002 119/664 |
| 2010/0307426 | A1 * | 12/2010 | Bertsch | A01K 13/002 119/633 |
| 2014/0026822 | A1 * | 1/2014 | Harris | A01K 13/002 119/625 |
| 2015/0272308 | A1 * | 10/2015 | Harrington | A46B 9/06 15/105 |
| 2018/0132452 | A1 * | 5/2018 | Dionne | A46B 9/023 |
| 2020/0060231 | A1 * | 2/2020 | Lin | A01K 13/002 |
| 2022/0400652 | A1 * | 12/2022 | Hartelius | A01K 13/00 |
| 2023/0090687 | A1 * | 3/2023 | Bushman | B26B 19/3846 30/208 |
| 2023/0131244 | A1 * | 4/2023 | Becattini, Jr. | B08B 1/165 15/209.1 |
| 2024/0276952 | A1 * | 8/2024 | Van Eyk | A46B 15/0059 |

\* cited by examiner

COMBINATION PET GROOMING TOOL AND METHODS

CROSS-REFERENCE TO RELATED APPLICATIONS

This application is a National Stage Application of PCT International Patent application No. PCT/US2022/040483, filed Aug. 16, 2022, which claims the benefit of priority to U.S. Provisional Patent Application No. 63/234,427 filed Aug. 18, 2021, which applications are incorporated herein by reference. To the extent appropriate a claim of priority is made to each of the above disclosed applications.

TECHNICAL FIELD

This disclosure relates grooming tools for animals, especially fur-coated animals. In particular, this disclosure relates to grooming tools for furry pets, in which the grooming tool has more than one brush characteristic.

BACKGROUND

Many households include animals as pets. For animals with fur coats, it is helpful to groom the animal to help keep the fur coat healthy and to prevent shedding of the fur throughout the owners house.

There are a variety of types of grooming tools available including, for example, deshedding tools that help to remove loose, dead undercoat without cutting or damaging the topcoat. One type of deshedding tool is described in U.S. Pat. No. 7,650,857, incorporated herein by reference. Additional types of grooming tools include mat breakers, curry combs, bristle brushes, wire pin brushes, and slicker brushes.

It can be burdensome to have multiple grooming tools. Improvements are desirable.

SUMMARY

A pet grooming tool is provided that improves the prior art.

In one aspect, a pet grooming tool is provided comprising: (a) a pet engageable portion having a first section of a first brush characteristic sandwiched between a second section and a third section of brush characteristics different from the first brush characteristic; and (b) a handle portion secured to the pet engageable portion sized for grasping by a human hand.

The tool may further comprise a fur removal mechanism to remove fur from the pet engageable portion.

The fur removal mechanism can include a push button to eject fur from the first section, second section, and third section.

In one example embodiment, the second section and third section have the same brush characteristic.

In an example, the first brush characteristic is a deshedder constructed and arranged to remove loose, dead undercoat without cutting or damaging a topcoat.

The deshedder may comprise a plurality of teeth having a plane of symmetry and a tip; the plane of symmetry defining a cross-section of the tip of the tooth; the cross-section of the tip of the tooth having a corner with an interior angle of between fifty and seventy degrees.

In some preferred arrangements, the plurality of teeth are arranged along a curved arch In one or more embodiments, the brush characteristic of the second section and third section is a slicker constructed and arranged to remove debris, tangles, and mat from fur.

In many examples, the slicker comprises a plurality of flexible fine wire bristles.

In some embodiments, the pet engageable portion is generally rectangular.

In some implementations, the handle portion includes: (a) a fixed piece secured to and projecting away from the pet engageable portion; (b) a free distal end; and (c) an elongated grip extending between the fixed piece and the distal end; the grip being axially and radially spaced from the pet engageable portion.

In some embodiments, the push button is positioned to project from the pet engageable portion adjacent to the fixed piece and on a side of the fixed piece opposite of the grip.

In one or more examples, the pet engageable portion is generally triangular.

The handle portion can a palm grip shape, in some examples.

In some example arrangements, the palm grip shape comprises an upper face having a center palm-engaging section flanked by opposite finger receiving concave sections; a front end face and an opposite rear end face being between the concave sections.

Some examples have the push button positioned within the front end face.

In one or more embodiments, the first brush characteristic is a deshedder extending generally across a diameter of the pet engageable portion.

In another aspect, a method of grooming a pet is provided. The method includes grasping a handle of a grooming tool; the handle secured to a pet engageable portion; and moving the pet engageable portion against fur of a pet, the pet engageable portion having a first section of a first brush characteristic sandwiched between a second section and third section of brush characteristics different from the first brush characteristic.

The method can further comprise a step of ejecting fur from the first section, second section, and third section.

The step of ejecting fur can include pushing a button.

In examples, the step of moving the pet engageable portion includes moving the first section being a deshedder section, and the second and third sections being slicker sections.

It is noted that not all the specific features described herein need to be incorporated in a arrangement for the arrangement to have some selected advantage according to the present disclosure.

Figure 2:
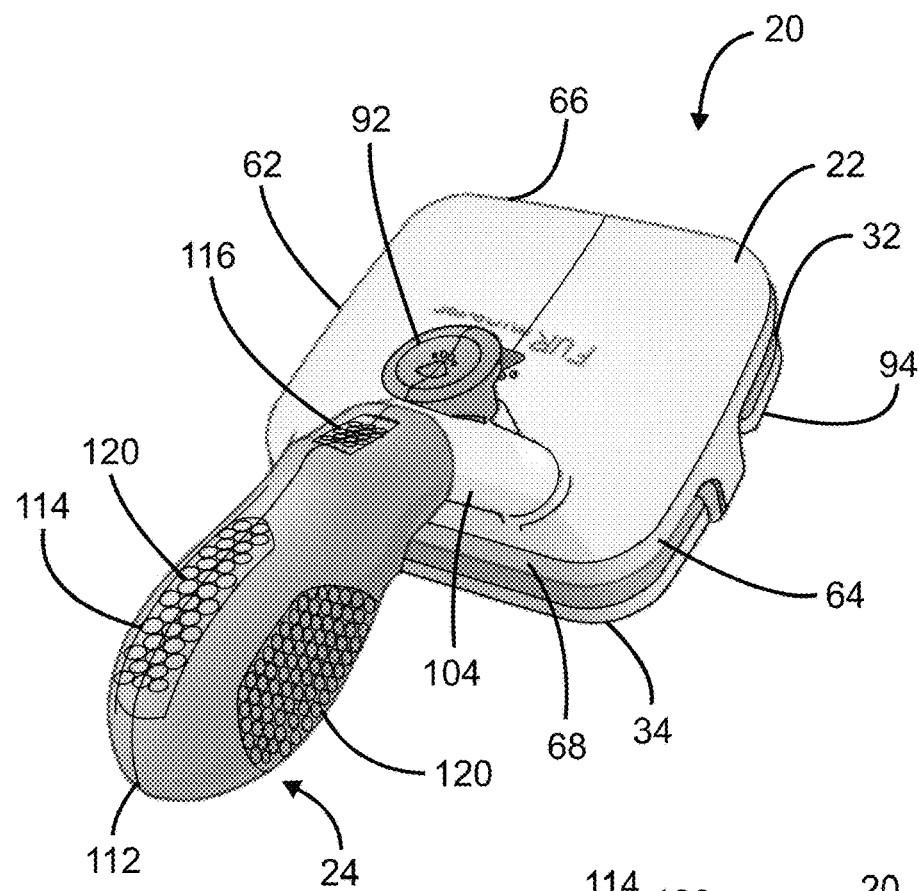
FIG. 2 is another top, perspective view of the grooming tool of FIG. 1.
Figure 1:
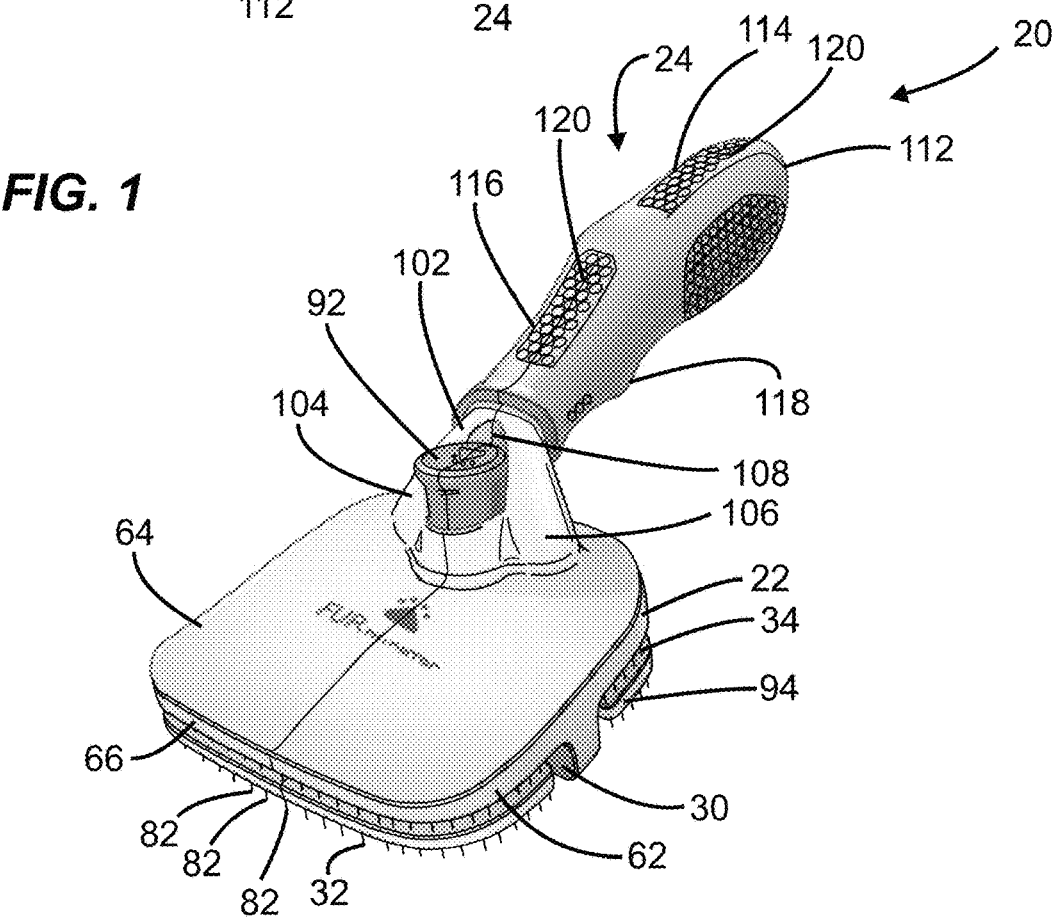
FIG. 1 is a top, perspective view of an embodiment of a grooming tool, constructed in accordance with principles of this disclosure.

The present technology may be more completely understood and appreciated in consideration of the following detailed description of various embodiments in connection with the accompanying drawings.

The figures are rendered primarily for clarity and, as a result, are not necessarily drawn to scale. Moreover, various structure/components, including but not limited to fasteners, and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION

A pet grooming tool is shown in general at 20. The tool 20 includes a pet engageable portion 22 and a handle portion 24. The handle portion 24 is secured to the pet engageable portion 22, and is sized for grasping by a human hand.

The pet engageable portion 22 is moved on, over, or against an animal's coat for grooming purposes. In general, the animal's coat will be of fur or hair. For example, the animal can be such animals that are typically kept as pets, including dogs or cats, but the tool 20 can be used on any animal with a fur or hair coat, such as rabbits or ferrets.

The pet engageable portion 22 has at least a first section 30 of a first brush characteristic sandwiched between a second section 32 and third section 34 of brush characteristics different from the first brush characteristic. By "sandwiched", it is meant that the first section 30 is bordered by the second section 32 and third section 34, which oppose each other. By "brush characteristic", it is meant a grooming function and/or a size. That is, there are various types of grooming functions, depending on what is desired to be accomplished by the grooming. Types of brush characteristics, i.e. grooming functions including: deshedding (removing loose, dead undercoat); dematting to remove mats; pin brushes to fluff detangled or wiry coats; bristle brushes as finishing tools to distribute natural oils and add shine; slicker brushes to detangle and remove lighter mats; rubber curry combs for massaging skin; and various types of combs for detangling, dematting, or fluffing. Size differences can include density (such as bristle or tooth density) and/or length of bristles/teeth.

Each of the first section 30, second section 32, and third section 34 can be of a different brush characteristic. Alternatively, at least two of the sections 30-34 can be the same characteristic. Alternatively, all three of the sections 30-34 can be the same characteristic but separated by clear, delineated section parts. Further, it is contemplated to have more than three sections of brush characteristics.

In the example embodiment shown, the first brush characteristic of the first section 30 is a deshedder, constructed and arranged to remove loose, dead undercoat without cutting or damaging a topcoat. The deshedder can be constructed according to U.S. Pat. No. 7,650,857, incorporated herein by reference. The deshedder may comprises a plurality of teeth 40, each having a front surface 42 and a rear surface 44. The plurality of teeth 40 extend downward at the bottom of the pet engageable portion 22. There can be between 7-9 teeth 40/cm. Each tooth 40 of an adjacent pair of teeth intersects the other at a root 46. Each tooth 40 become narrower as it extends downward and ultimately terminates at a rounded or otherwise blunted tip 48.

Figure 9:
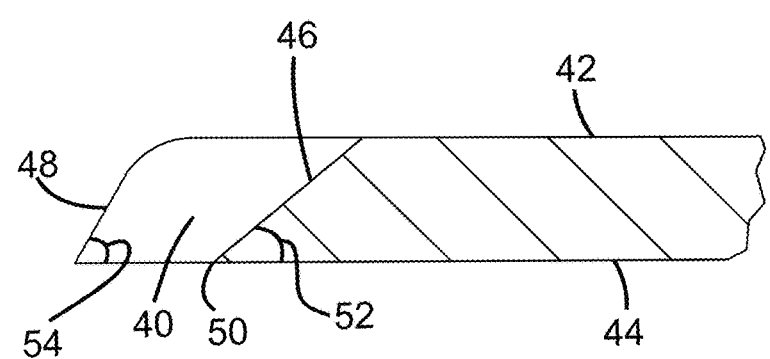
FIG. 9 is a cross-sectional view of one of the teeth used in a section of the grooming tool of FIGS. 1-8.

As shown in FIG. 9, the roots 46 are angled obliquely from the rear surface 44 to form an edge 50 having an acute inside angle 52. This angle 52 is between thirty and fifty degrees, and preferably between thirty-five and forty-five degrees, and more preferably about forty degrees. As is also shown in FIG. 9, the lowermost surface of each tooth tip 48 is also angled obliquely from the rear surface 44. As such, the cross-section of the tip 48 of each tooth 40, taken at the plane of symmetry of the tooth 40, has a corner at the lowermost portion of the rear surface 44 that has an acute angle 54. This angle 54 is between fifty and seventy degrees, and preferably between fifty-five and sixty-five degrees, and more preferably about sixty degrees.

Figure 3:
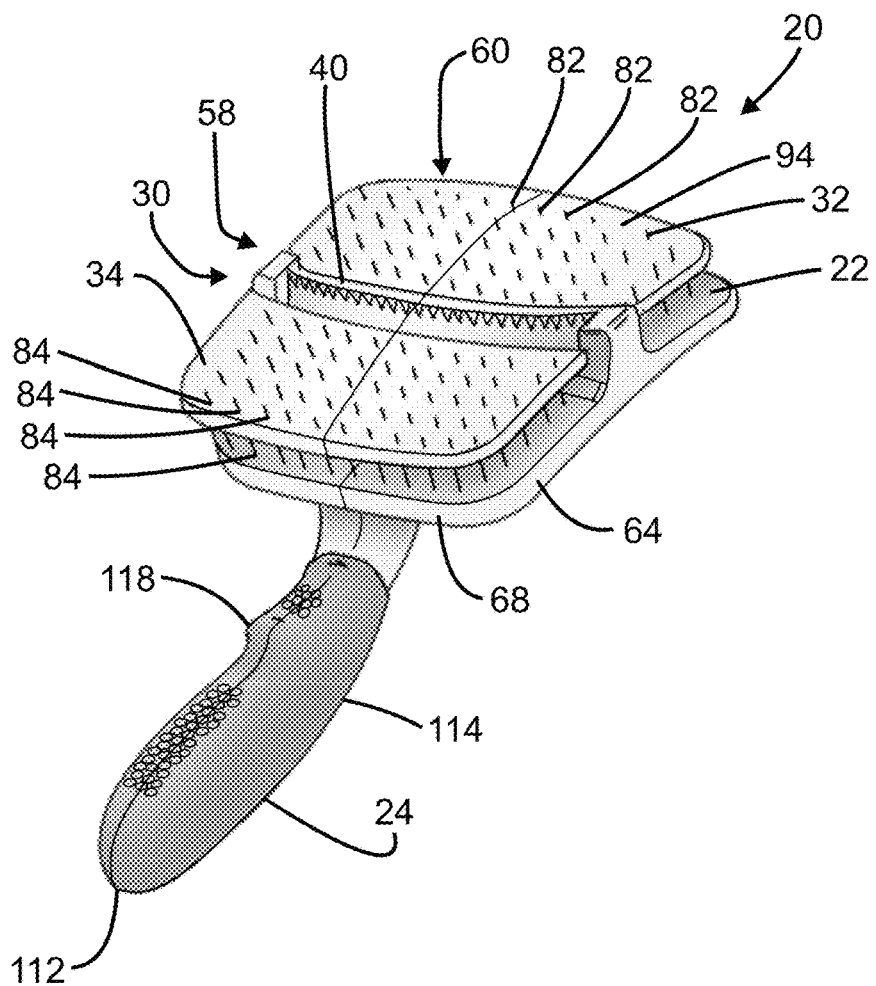
FIG. 3 is a bottom, perspective view of the grooming tool of FIG. 1.
Figure 5:
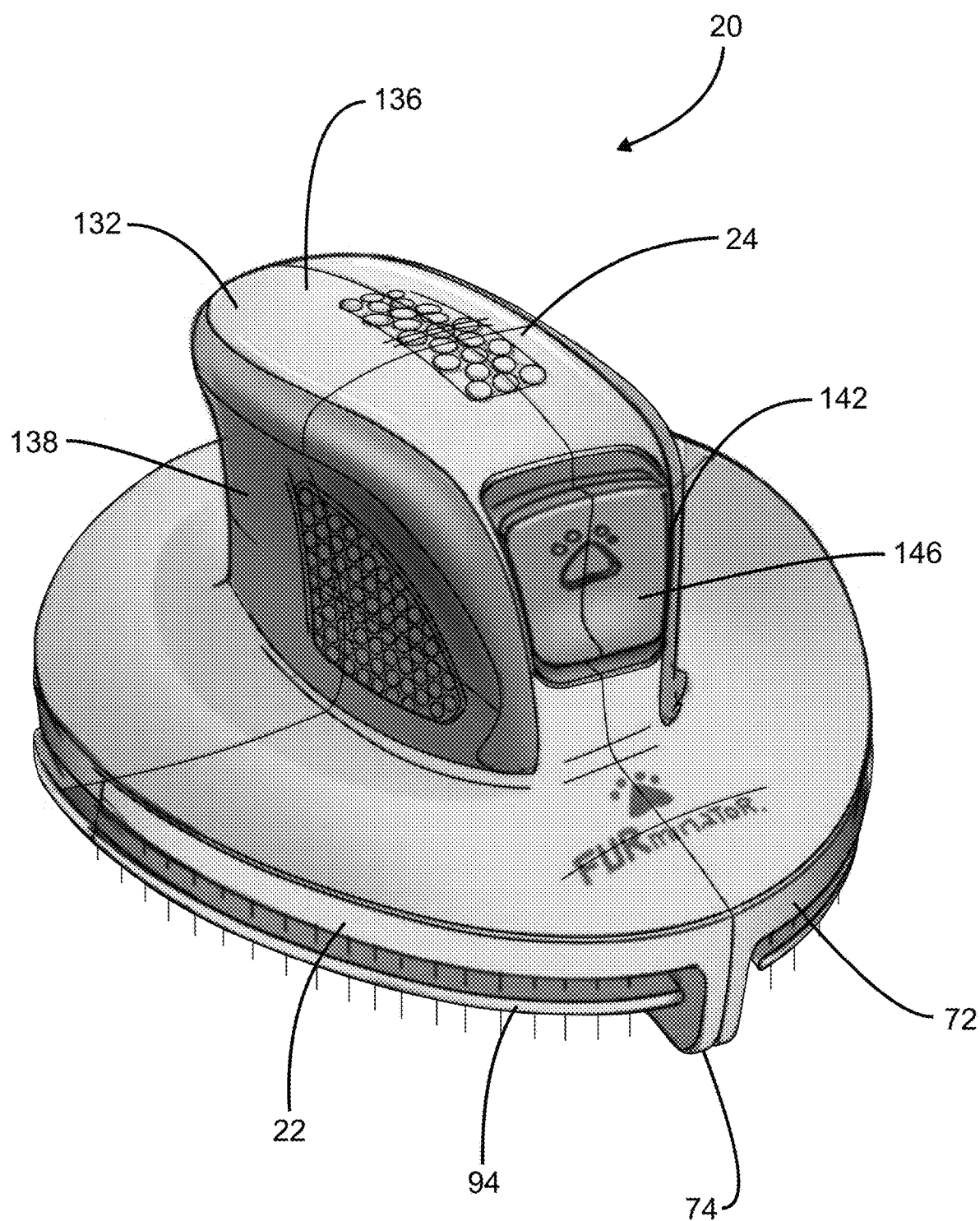
FIG. 5 is a top, perspective view of another embodiment of a grooming tool, constructed in accordance with principles of this disclosure.
Figure 6:
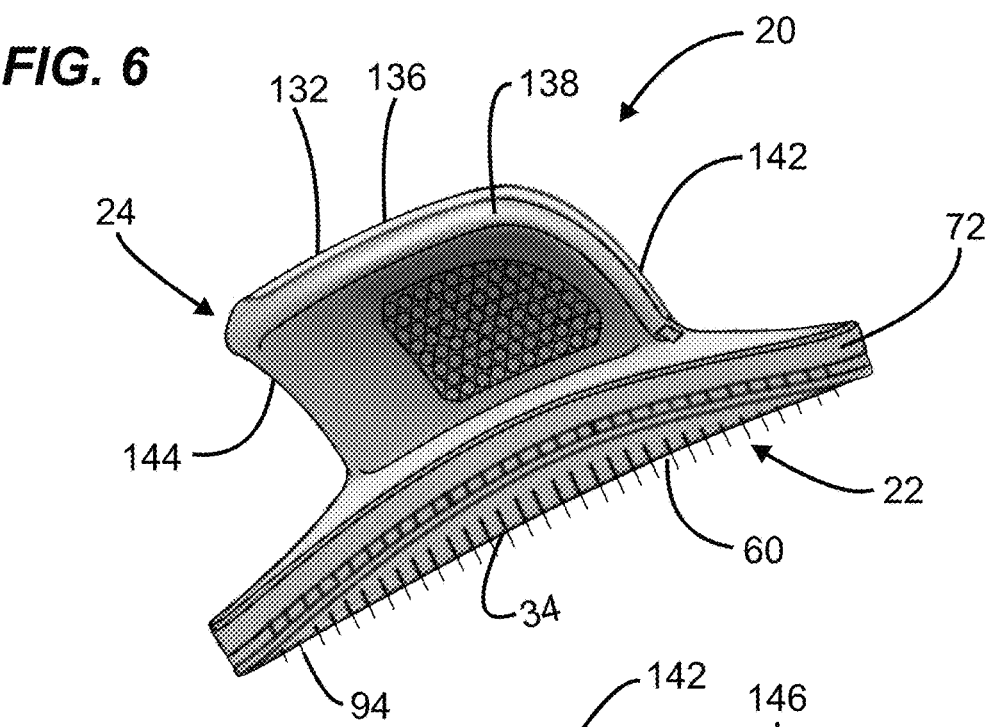
FIG. 6 is a side elevational view of the grooming tool of FIG. 5.
Figure 7:
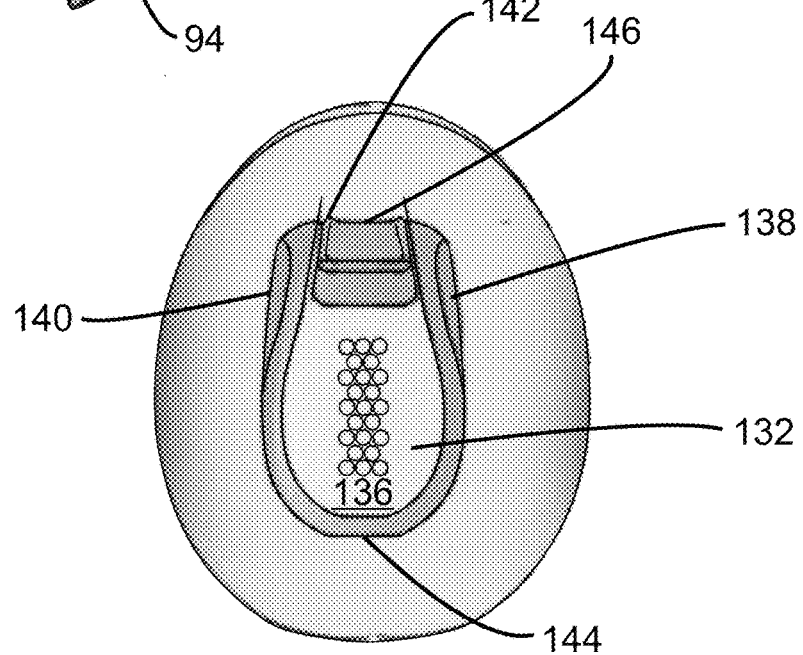
FIG. 7 is a top plan view of the grooming tool of FIG. 5.

In FIG. 3, the first section 30 extends generally along a linear region 58 across a face 60 of the pet engageable portion 22. The face 60 is shown as generally rectangular in shape, with a pair of generally lateral edges 62, 64; a front edge 66; and a rear edge 68. The linear region 58 is depicted here as extending from lateral edge 62 to lateral edge 64. The handle portion 24 extends generally from adjacent the rear edge 68, centered between the lateral edges 62, 64.

In preferred embodiments, the plurality of teeth 40 in the first section 30 are arranged along a curved arch to be concave between the lateral edges 62, 64. That is, when viewing the 60 in plan view, the ends the teeth 40 at the lateral edges 62, 64 are closer to the viewer than the centerpoint of the first section 30.

In the FIG. 3 embodiment, the first section 30 is generally centered between the front edge 66 and rear edge 68.

Figure 8:
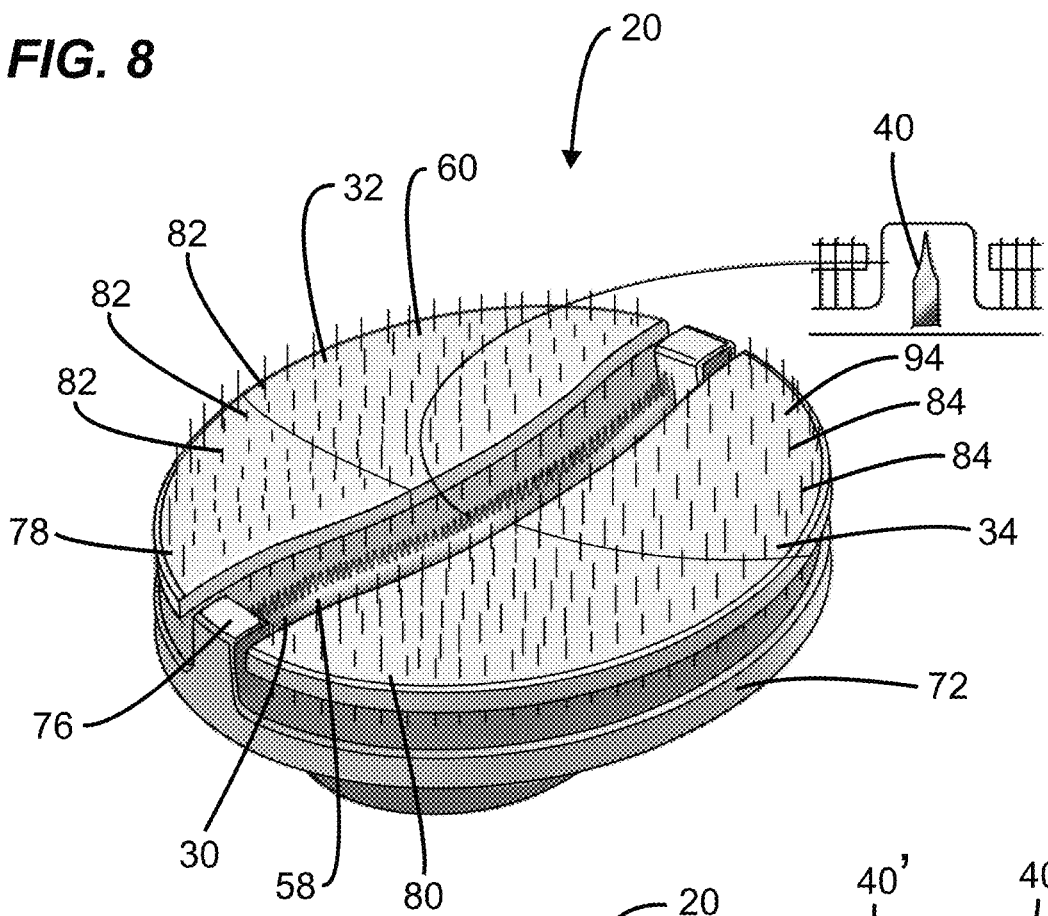
FIG. 8 is a bottom, perspective view of the grooming tool of FIG. 5.

FIG. 8 depicts an alternate embodiment for the pet engageable portion 22. The face 60 in FIG. 8 is generally round (i.e., circular) in shape, having an outer perimeter base edge 72. The first section 30 extends generally along a linear region 58 across face 60 from projecting tab 74 to protecting tab 76 across a diameter of the face 60, and centered across the face 60.

In the example embodiment illustrated, the second section 32 is a slicker constructed and arranged to remove debris, tangles, and mat from fur. In this example, the slicker comprises a plurality of flexible fine wire bristles 82 each having a longitudinal axis generally angled non-orthogonal to the face 60, although in some embodiments, the bristles 82 can be orthogonal to the face 60.

In this example embodiment, the third section 34 has the same brush characteristic as the second section 32. As such, the third section 34 is a slicker constructed and arranged to remove debris, tangles, and mat from fur having a plurality of flexible fine wire bristles 84.

In FIG. 3, the second section 32 extends between the lateral edges 62, 64 from the front edge 66 to the first section 30, along a plurality of rows of the bristles 82. The third section 34 extends between the lateral edges 62, 64 from the rear edge 68 to the first section 30, along a plurality of rows of the bristles 84. The second section 32 and third section 34 are generally rectangular shaped sections in FIG. 3.

In FIG. 8, the second section 32 extends from perimeter base edge 72 to the first section 30, such that the second section 32 covers a segment 78 of the face 60. The third section 34 extends from perimeter base edge 72 to the first section 30, on a side of the first section 30 opposite of the segment 78 covered by the second section 32. The third section 34 covers a segment 80 of the face 60.

In accordance with principles of this disclosure, the tool 20 includes a fur removal mechanism 90. The fur removal mechanism 90 selectively removes fur from the pet engageable portion 22. The fur removal mechanism 90 can be constructed like that described in U.S. Pat. No. 8,960,129, incorporated herein by reference in its entirety.

Figure 4:
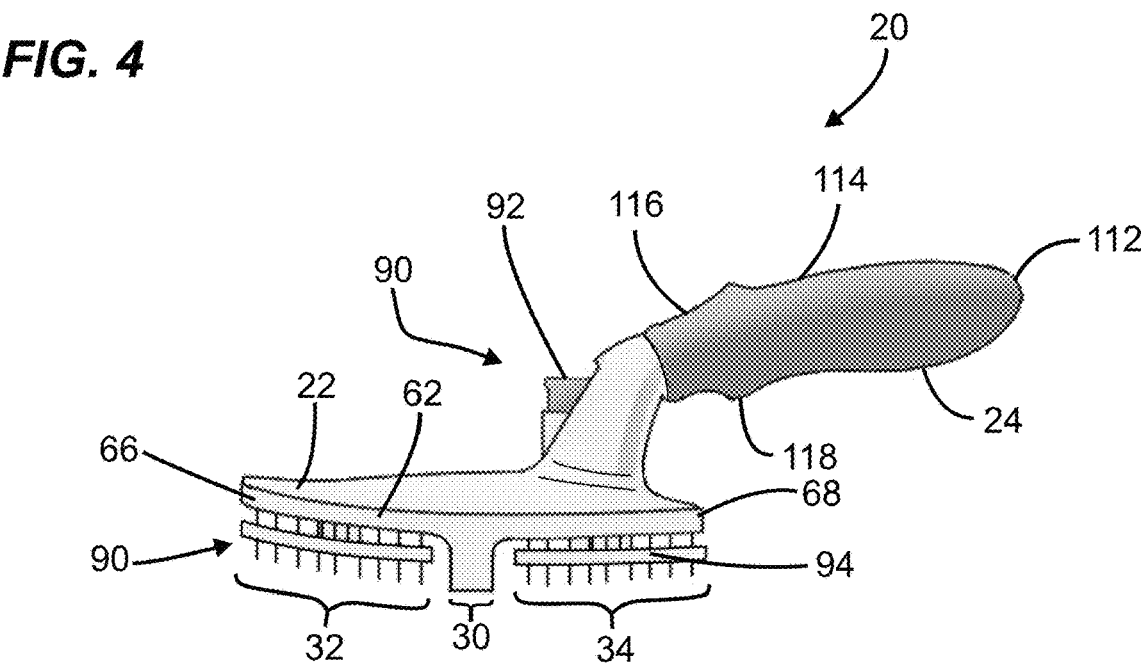
FIG. 4 is a side elevational view of the grooming tool of FIG. 1, showing hair/fur being ejected.

In one example embodiment, the fur removal mechanism 90 comprises a push button 92 to eject fur from the first section 30, second section 32, and third section 34. While there can be many variations, in the example shown in FIG. 4, the push button 92 is spring-biased and moves a plate 94 axially away from the face 60 and through the first section 30, second section 32, and third section 34 to eject or push off hair or fur that has accumulated on each of the first section 30, second section 32, and third section 34. The plate 94 is biased, in resting position, against the face 60, such that upon pushing of the button 92, the plate 94 is moved against the spring, away from the face 60, and over (or through) the teeth 40 and bristles 82, 84. When force on the button 92 is released, the plate 94 returns to a resting position against the face 60.

In accordance with principles of this disclosure, the handle portion 24 of FIGS. 1-4 includes a fixed piece 102 secured to, and projecting away from, the pet engageable portion 22. In the embodiment of FIGS. 1-4, the fixed piece 102 projects axially away from the pet engageable portion 22 adjacent to the rear edge 68 of the face 60. In this example embodiment, the fixed piece 102 is V-shaped, with the ends of the legs 104, 106 of the V-shape being secured to the pet engageable portion 22, while the apex 108 of the V-shape being axially space from and over the pet engageable portion.

The handle portion 24 includes a free distal end 112. The distal end 112 is both radially spaced and axially spaced from the pet engageable portion 22.

The handle portion 24 includes an elongated grip 114 extending between the fixed piece 102 and the distal end 112. The grip 114 is both axially and radially spaced from the pet engageable portion 22. In this embodiment, the grip 114 includes an optional index finger recess 116 and thumb rest 118. The grip 114 can also have an optional texturized area 120 for enhanced gripping.

In the example embodiment of FIGS. 1-4, the push button 92 is positioned to project from the pet engageable portion 22 adjacent to the fixed piece 102 and on a side of the fixed piece 102 opposite of the grip 114. In many example embodiments, the push button 92 is located between the legs 104, 106, just forward of the apex 108 of the fixed piece 102. Many alternatives are possible.

In accordance with principles of this disclosure, the handle portion 24 of FIGS. 5-8 is palm-grip shaped. The palm grip shape comprises an upper face 132 having a center palm-engaging section 136 flanked by opposite finger receiving concave sections 138, 140. A front end face 142 and an opposite rear end face 144 are being between the concave sections 138, 140. The front end face 142 and rear end face 144 extend from the pet engageable portion 22 to meet the upper face 132.

The concave sections 138, 140 are sized to accommodate a human thumb in one of the sections 138, 140, while the opposite section 140, 138 accommodates one or more fingers or finger tips.

In the FIG. 8 embodiment, the projecting tabs 74, 76, and the first section 30 have a central longitudinal axis that is generally parallel to a longitudinal axis extending from the front end face 142 to the rear end face 144. In some example embodiments, these longitudinal axes are co-planar within a plane that also bisects the tool 20.

In the FIG. 5-8 embodiment, the push button 92 of the fur removal mechanism 90 comprises a push button 146 positioned within the front end face 142.

In the embodiment of FIGS. 5-8, the teeth 40 of the deshedder first section 30 are preferably provided such that they are operative in removing loose hair/fur when moved in both directions perpendicular to a plane containing the first section 30. An example one of the teeth 40 is shown in the enlarged section of FIG. 8. That is, when the tool 20 of FIGS. 5-8 is grasped by the handle portion 22 with the first section 30 extending along a North-South line, the tool 20 can be moved across the pet's fur toward either the East (toward the right) or West (toward the left), and the deshedder first section 30 will operate as intended by removing loose, dead undercoat without cutting or damaging a topcoat.

Figure 10:
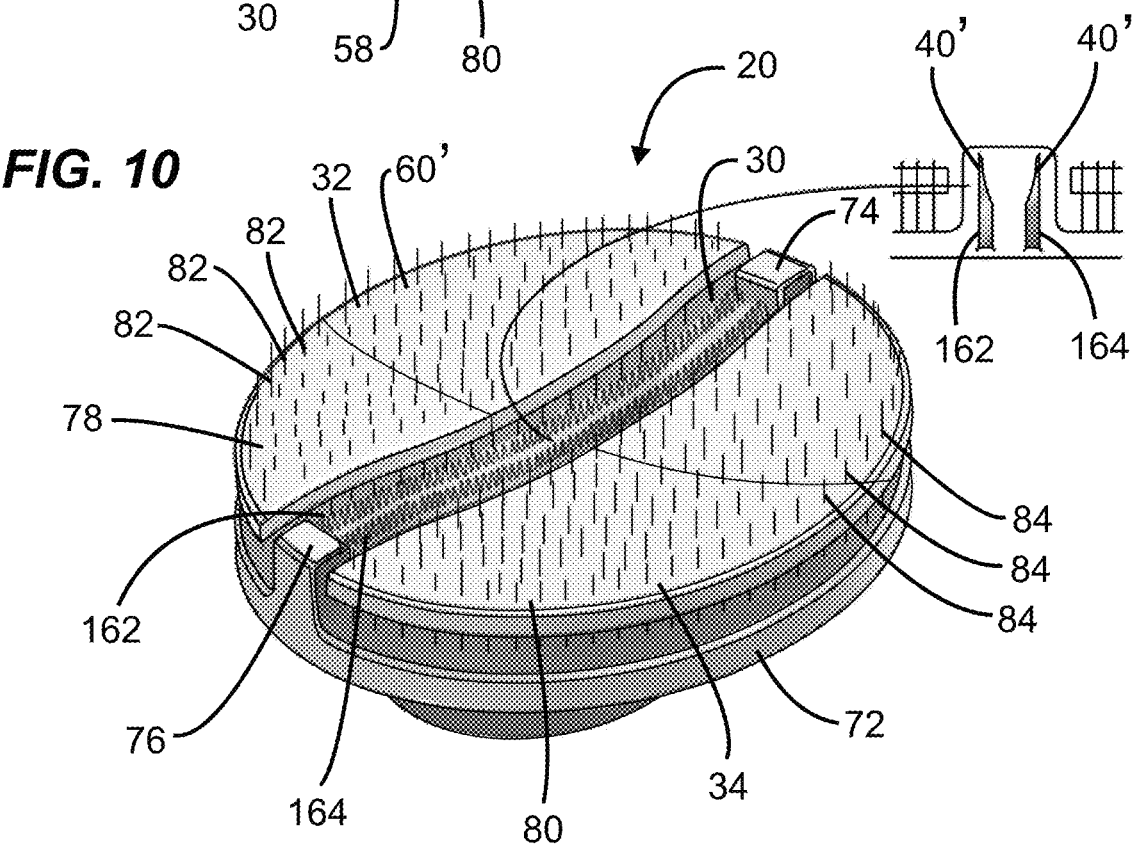
FIG. 10 is a bottom, perspective view of showing an alternative embodiment of the grooming tool of FIG. 5.

In the FIG. 8 embodiment, the teeth 40 are in a single row across the diameter of the face 60 of the tool 20. The teeth 40 of FIG. 8 are symmetrical, such that they will be effective when moved in both directions perpendicular to a plane containing the first section 30. FIG. 10 shows an alternative embodiment of the face 60 of the tool 20 at 60'. The face 60' is similar to that shown in FIG. 8, except that the teeth 40' in the first section 30 are in a plurality of spaced rows 162, 164. In this case, there are two rows 162, 164 of teeth 40'. As shown in the enlarged section of FIG. 10, each of the rows 162, 164 of teeth 40' are oriented to work in their own single direction. That is, row 162 of teeth 60' are oriented to work in one direction perpendicular to a plane containing the first section 30, while row 164 is oriented to work in the opposite direction perpendicular to a plane containing the first section 30. The row 162 and the row 164 are in opposition to each other. Because of the arrangement of the teeth 40' in the rows 162, 164, they will be effective when moved in both directions perpendicular to a plane containing the first section 30.

As can be seen in FIGS. 8 and 10, the teeth 40, 40' are along a curved arch.

The above can be used in a method of grooming a pet. The method includes grasping a handle of a grooming tool. For example, the handle can be handle portion 24, and the grooming tool 20. The handle is secured to a pet engageable portion, such as pet engageable portion 22.

The method includes a step of moving the pet engageable portion 22 against fur (or hair) of a pet. The pet engageable portion 22 will having a first section of a first brush characteristic sandwiched between a second section and third section of brush characteristics different from the first brush characteristic. For example, the first section can as described above for first section 30, second section 32, and third section 34. This can include the first section 30 being a deshedder section; and the second and third sections 32, 34 being slicker sections.

The method can further comprise a step of ejecting fur from the first section 30, second section 32, and third section 34. The step of ejecting fur can include pushing a button, such as button 92.

In one example, the step of grasping a handle includes grasping a grip 114 extending from the pet engageable portion 22. In another example, the step of grasping a handle includes grasping a palm engaging section 136.

ASPECTS

Aspect 1. A pet grooming tool is provided comprising: (a) a pet engageable portion having a first section of a first brush characteristic sandwiched between a second section and a third section of brush characteristics different from the first brush characteristic; and (b) a handle portion secured to the pet engageable portion sized for grasping by a human hand.

Aspect 2. The tool of aspect 1 further comprising a fur removal mechanism to remove fur from the pet engageable portion.

Aspect 3. The tool of aspect 2 wherein the fur removal mechanism comprises a push button to eject fur from the first section, second section, and third section.

Aspect 4. The tool of any one of aspects 1-3 wherein the second section and third section have the same brush characteristic.

Aspect 5. The tool of any one of aspects 1-4 wherein the first brush characteristic is a deshedder constructed and arranged to remove loose, dead undercoat without cutting or damaging a topcoat.

Aspect 6. The tool of aspect 5 wherein the deshedder comprises a plurality of teeth having a plane of symmetry and a tip; the plane of symmetry defining a cross-section of the tip of the tooth; the cross-section of the tip of the tooth having a corner with an interior angle of between fifty and seventy degrees.

Aspect 7. The tool of aspect 6 wherein the plurality of teeth are arranged along a curved arch.

Aspect 8. The tool of any one of aspects 1-7 wherein the brush characteristic of the second section and third section is a slicker constructed and arranged to remove debris, tangles, and mat from fur.

Aspect 9. The tool of aspect 8 wherein the slicker comprises a plurality of flexible fine wire bristles.

Aspect 10. The tool of any one of aspects 1-9 wherein the pet engageable portion is generally rectangular.

Aspect 11. The tool of any one of aspects 1-10 wherein the handle portion includes: (a) a fixed piece secured to and projecting away from the pet engageable portion; (b) a free distal end; and (c) an elongated grip extending between the fixed piece and the distal end; the grip being axially and radially spaced from the pet engageable portion.

Aspect 12. The tool of aspect 3 and 11 wherein the push button is positioned to project from the pet engageable portion adjacent to the fixed piece and on a side of the fixed piece opposite of the grip.

Aspect 13. The tool of any one of aspects 1-9 wherein the pet engageable portion is generally round.

Aspect 14. The tool of aspect 13 wherein the handle portion is a palm grip shape.

Aspect 15. The tool of aspect 14 wherein the palm grip shape comprises an upper face having a center palm-engaging section flanked by opposite finger receiving concave sections; a front end face and an opposite rear end face being between the concave sections.

Aspect 16. The tool of aspect 3 and 15 wherein the push button is positioned within the front end face.

Aspect 17. The tool of any one of aspects 13-15 wherein the first brush characteristic is a deshedder extending generally across a diameter of the pet engageable portion.

Aspect 18. The tool of any one of aspects 1-5 and 13-17 wherein the first brush characteristic is a deshedder having a plurality of teeth and arranged to be effective when moved in opposite directions perpendicular to a plane containing the first section.

Aspect 19. The tool of aspect 18 wherein the plurality of teeth are in two spaced rows.

Aspect 20. A method of grooming a pet; the method comprising: (a) grasping a handle of a grooming tool; the handle secured to a pet engageable portion; and (b) moving the pet engageable portion against fur of a pet, the pet engageable portion having a first section of a first brush characteristic sandwiched between a second section and third section of brush characteristics different from the first brush characteristic.

Aspect 21. The method of aspect 20 further comprising a step of ejecting fur from the first section, second section, and third section.

Aspect 22. The method of aspect 21 wherein the step of ejecting fur includes pushing a button.

Aspect 23. The method of any one of aspects 20-22 wherein the step of moving the pet engageable portion includes moving the first section being a deshedder section, and the second and third sections being slicker sections.

The above describes example principles. Many embodiments can be made using these principles.

What is claimed is:

1. A pet grooming tool comprising:
   (a) a pet engageable portion having a first section of a first brush characteristic sandwiched between a second section and a third section of brush characteristics different from the first brush characteristic; the first section extending linearly across a face of the pet engageable portion and having a curved arch to be concave between opposing lateral edges, and positioned intermediate between the front edge and rear edge, with the second section extending from a front edge of the face to the first section and the third section extending from a rear edge to the first section, wherein the first, second, and third sections are spatially arranged such that the second section is positioned entirely forward of the first section and the third section is positioned entirely rearward of the first section; and
   (b) a handle portion secured to the pet engageable portion sized for grasping by a human hand.

2. The tool of claim 1 wherein the second section and third section have the same brush characteristic.

3. The tool of claim 1 wherein the pet engageable portion is generally rectangular.

4. The tool of claim 1 wherein the handle portion includes:
   (a) a fixed piece secured to and projecting away from the pet engageable portion;
   (b) a free distal end; and
   (c) an elongated grip extending between the fixed piece and the free distal end; the elongated grip being axially and radially spaced from the pet engageable portion.

5. The tool of claim 1 further comprising a fur removal mechanism to remove fur from the pet engageable portion.

6. The tool of claim 5 wherein the fur removal mechanism comprises a push button to eject fur from the first section, second section, and third section.

7. The tool of claim 6 wherein the handle portion includes:
   (a) a fixed piece secured to and projecting away from the pet engageable portion;
   (b) a free distal end;
   (c) an elongated grip extending between the fixed piece and the free distal end; the elongated grip being axially and radially spaced from the pet engageable portion; and
   wherein the push button is positioned to project from the pet engageable portion adjacent to the fixed piece and on a side of the fixed piece opposite of the elongated grip.

8. The tool of claim 1 wherein the first brush characteristic is a deshedder constructed and arranged to remove loose, dead undercoat without cutting or damaging a topcoat.

9. The tool of claim 8 wherein the deshedder comprises a plurality of teeth having a plane of symmetry and a tip; the plane of symmetry defining a cross-section of the tip of the tooth; the cross-section of the tip of the tooth having a corner with an interior angle of between fifty and seventy degrees.

10. The tool of claim 8, wherein the deshedder comprises a plurality of teeth having a plane of symmetry and a tip; the plane of symmetry defining a cross-section of the tip of the tooth; the cross-section of the tip of the tooth having a corner with an interior angle of between fifty and seventy degrees, wherein the plurality of teeth are arranged along a curved arch that is concave when viewed from above the pet engageable portion.

11. The tool of claim 1 wherein the brush characteristic of the second section and third section is a slicker constructed and arranged to remove debris, tangles, and mat from fur.

12. The tool of claim 11 wherein the slicker comprises a plurality of flexible fine wire bristles.

13. The tool of claim 1 wherein the first brush characteristic is a deshedder having a plurality of teeth arranged along the curved arch and arranged to be effective when moved in opposite directions perpendicular to a plane containing the first section.

14. The tool of claim 13 wherein the plurality of teeth are in two spaced rows positioned parallel to each other along the curved arch.

\* \* \* \* \*